United States Patent
Falk

(10) Patent No.: US 9,806,883 B2
(45) Date of Patent: Oct. 31, 2017

(54) SECURE PROVISION OF A KEY

(71) Applicant: Rainer Falk, Poing (DE)

(72) Inventor: Rainer Falk, Poing (DE)

(73) Assignee: Siemens Aktiengesellschaft, München (DE)

( * ) Notice: Subject to any disclaimer, the term of this patent is extended or adjusted under 35 U.S.C. 154(b) by 48 days.

(21) Appl. No.: 14/576,458

(22) Filed: Dec. 19, 2014

(65) Prior Publication Data
US 2015/0180654 A1    Jun. 25, 2015

(30) Foreign Application Priority Data
Dec. 23, 2013    (DE) .................. 10 2013 227 087

(51) Int. Cl.
| H04L 9/08 | (2006.01) |
| H04L 9/14 | (2006.01) |
| G09C 1/00 | (2006.01) |

(52) U.S. Cl.
CPC .............. H04L 9/0816 (2013.01); G09C 1/00 (2013.01); H04L 9/0866 (2013.01); H04L 9/14 (2013.01); *H04L 2209/24* (2013.01)

(58) Field of Classification Search
CPC ...... G09C 1/00; H04L 9/0866; H04L 2209/24
See application file for complete search history.

(56) References Cited

U.S. PATENT DOCUMENTS

| 8,423,789 B1 | 4/2013 | Poo et al. |
| 2003/0102493 A1 | 6/2003 | Wuidart et al. |
| 2007/0101122 A1* | 5/2007 | Guo ................ H04L 63/061 713/153 |
| 2009/0019284 A1 | 1/2009 | Cho et al. |
| 2012/0077501 A1 | 3/2012 | Zhang et al. |
| 2012/0137137 A1 | 5/2012 | Brickell et al. |
| 2012/0254997 A1* | 10/2012 | Norrman ............ H04L 63/14 726/22 |
| 2014/0053278 A1* | 2/2014 | Dellow ............... G06F 21/60 726/27 |
| 2015/0281958 A1* | 10/2015 | Simplicio Junior .. H04W 12/04 713/155 |

FOREIGN PATENT DOCUMENTS

| CN | CN101176295 A | 5/2008 |
| CN | CN101931951 A | 12/2010 |

OTHER PUBLICATIONS

European Search Report for related European Application 14187945.2, dated Jun. 30, 2015, with English Translation.
German Office Action dated Sep. 17, 2014 for corresponding German Patent Application No. DE 10 2013 227 087.9 with English translation.
Chinese Office Action for related Chinese Application No. 2014 108 07 115.1 dated Aug. 1, 2017.

* cited by examiner

*Primary Examiner* — Ellen Tran
(74) *Attorney, Agent, or Firm* — Lempia Summerfield Katz LLC

(57) ABSTRACT

The embodiments relate to a method and a digital circuit area for securely providing a key using a request unit and a provision unit. In this case, a key is derived from parameters, at least one of which is used for the key derivation in a non-predefinable manner by the request unit. In this case, the key derivation is carried out in a digital circuit area in which the request unit and the provision unit are implemented.

20 Claims, 1 Drawing Sheet

US 9,806,883 B2

SECURE PROVISION OF A KEY

CROSS-REFERENCE TO RELATED APPLICATIONS

This application claims the benefit of DE 10 2013 227 087.9, filed on Dec. 23, 2013, which is hereby incorporated by reference in its entirety.

TECHNICAL FIELD

The embodiments relate to a method and a digital circuit area for securely providing a key using a request unit and a provision unit.

BACKGROUND

Control devices are used in control systems for industrial applications. These control devices are known as embedded control devices. In this case, a complex overall system may be constructed by networking a plurality of embedded individual systems or so-called embedded systems. So-called systems on chip (SoC) are often used to implement embedded systems. In this case, a system on chip often contains a main processor unit or central processing unit (CPU) and an integrated digital circuit in which it is possible to configure or program a logic circuit, a so-called field programmable gate array (FPGA). In the system on chip, different functions are therefore integrated in a semiconductor circuit. In this case, memories, for example random access memories (RAM) or flash memories or electrically erasable programmable read-only memories (EEPROM), are often implemented as separate modules. It is likewise possible to also integrate them. In this case, a main processor unit may be provided as a fixed functional unit of a system on chip in the form of a so-called hard core. It is likewise possible to implement a main processor unit as configurable logic as part of the configurable logic circuit, that is to say in the form of a so-called soft core.

In this case, software, (e.g., embedded Linux), is executed for the purpose of executing a program by a processor, (e.g., the main processor unit).

Cryptographic key material is used for numerous applications in which a program is executed by a processor of a system on chip or of a digital circuit area. This may be required by security or safety requirements, in particular.

In this case, the practice of storing cryptographic keys as part of the software or as part of configuration data for the software is known. The key material, however, is scarcely protected in these cases. A key may be concealed in a software environment using so-called white box cryptography methods. In this case, the software as such may be easily attacked, read, or manipulated. The key material is therefore not very well protected against attacks.

It is known to provide a so-called companion chip for a chip, which companion chip carries out authentication. In this case, cryptographic calculations are used to check the authorization of a chip, for example, in order to detect a replica or an unauthorized copy of the chip or to prevent unauthorized access. In this case, the companion chip is an external, that is to say physically separate, authentication chip. In this case, the data interface between the chip and the companion chip is easily accessible to an attacker and communication may therefore be easily intercepted or manipulated.

In this case, external authentication chips may carry out a key derivation that provides a key from desired input parameters on request.

SUMMARY AND DESCRIPTION

The scope of the present invention is defined solely by the appended claims and is not affected to any degree by the statements within this summary. The present embodiments may obviate one or more of the drawbacks or limitations in the related art.

Against this background, the embodiments described herein relate to securely provide a derived key.

The embodiments relate to a method for securely providing a derived key using a request unit and a provision unit that are implemented in a common digital circuit area, having the following acts: (a) the request unit requests the derived key from the provision unit; (b) the first parameter, which may be predefined by the request unit, is transmitted from the request unit to the provision unit; (c) a secret key is determined by the provision unit, the request unit not being able to have any access to the secret key; (d) the derived key is generated by the provision unit by a key derivation function in a key derivation module from the secret key, the first parameter and a predefined second parameter, the second parameter being used for the key derivation function in a non-predefinable manner by the request unit; and (e) the request unit is provided with the derived key.

In the present application, a key is understood as providing cryptographic key material. It may be a symmetrical key, in particular, in this case.

In the present application, a digital circuit area is understood as referring to, in particular, a programmable or configurable logic gate array or a field programmable gate array (FPGA) or an application-specific integrated semiconductor module or an application-specific integrated circuit (ASIC).

In the present case, a key derivation function is understood as referring to, in particular, a one-way function, in particular a hash function (SHA1, SHA2, SHA3) or a keyed hash function (HMAC) or a checksum calculation function (AES-CBC-MAC), which derives a derived key from an available cryptographic key. The derivation of a special-purpose key or a key duplication may be involved in this case, for example.

The described input parameters such as, in particular, the first parameter, the second parameter and the secret key, are understood as referring to input values for the key derivation function.

The method presented enables a key derivation inside a digital circuit area. In this case, a request unit, which is provided with the derived key itself, predefines the first parameter. This first parameter makes it possible to request the derived key, in particular for a particular purpose. This purpose may be coded in the first parameter, in particular. Furthermore, the request unit may control the provision of a further derived key, for example at a later time, by predefining the first parameter. The first parameter may be changed by incrementation, for example, and may thus indicate a further or new request.

In addition to the first parameter, a second parameter is also included in the key derivation function for generating the derived key. This second parameter is determined by the provision unit and is used for the key derivation function and cannot be stipulated by the request unit; that is to say the request unit cannot predefine the second parameter. In this case, "non-predefinable" provides, in particular, that the second parameter cannot be predefined or changed by the request unit or the second parameter cannot be replaced with a replacement parameter from the request unit. In particular, the second parameter is completely predefined by the provision unit. In particular, the request unit does not know the second parameter or the request unit cannot query the second parameter. In another variant, the second parameter may be queried but not predefined by the request unit. Furthermore, a conclusion with respect to the parameters used and therefore the second parameter, in particular, is advantageously not possible on the basis of the derived key provided.

In another variant, although the second parameter cannot be predefined by the request unit, it may be updated by the latter. Therefore, the value of the second parameter as such cannot be predefined or completely predefined, but the value is generated on the basis of a predefinition from the request unit. In this case, the request unit may initiate updating of the second parameter and may optionally provide an update parameter. In particular, in this embodiment of the method too, the value of the second parameter is ultimately stipulated or determined by the provision unit. For example, the second parameter is generated by the provision unit on the basis of an update parameter. In this case, the request unit may or else cannot be provided with the updated second parameter. In another variant, the request unit is provided with a parameter reference value derived from the second parameter.

Therefore, there is no need for an external key memory. In addition, there is no need for any complicated integration of an external key derivation module. Whereas the transmission of the input parameters and the derived key material, in particular, is secured when a key derivation is implemented on an external chip, the security of the key provision method as described here is simultaneously higher with a lower resource requirement and without the effort of integrating external resources.

The request unit, which is a main processor, for example, does not have access to the secret key contained in the function block of the provision unit. The request unit cannot request a key derived from the secret key for derivation parameters that may be arbitrarily selected by itself since the provision unit compulsorily uses a second parameter, in addition to the first parameter, as a derivation parameter. The internal incorporation of the second parameter inside the provision unit reduces the possibility of the provision unit being misused by manipulated or untrusted programs that are executed on a processor of the digital circuit area, for example, and which request a derived key using the request unit.

This is particularly advantageous if the secret key is identical on a plurality of devices with respective digital circuit areas. This is the case, in particular, if identical FPGA programming data, so-called bit streams, are used during production to simplify key management. The second parameter, which is compulsorily predefined, may also provide in these cases that a key is not improperly derived. In particular, the derived key is specific to a particular device or a particular digital circuit area. It therefore cannot be improperly used in other digital circuit areas or devices, in particular.

The described method provides so-called hardware anchoring of the security. Hardware anchoring provides that, in particular, cryptographic keys or the derivation of cryptographic keys has/have an anchoring to the hardware on which it/they is/are used. The hardware anchoring may be a security or safety requirement imposed on a digital circuit area. Greater robustness with respect to attacks is thus achieved in comparison with the use of a pure software solution. The use of the provision unit as a security function block inside the digital circuit area provides, on the one hand, a high degree of security on account of the hardware anchoring and, on the other hand, a high degree of security on account of the implementation inside the digital circuit area, (e.g., a system on chip), without integration solutions of a separate security controller. The security is therefore nevertheless increased in comparison with known methods with a small amount of integration effort. There is advantageously no need for any accessible lines that are present when integrating external security controllers.

As a result of the compulsory use of a predefined parameter that cannot be determined or stipulated by the request unit, a main processor unit that also includes the request unit, for example, cannot request a derived key for derivation parameters that may be arbitrarily selected. If manipulated software is executed on the main processor unit, for example, secret key material nevertheless cannot be spied out using the software of the main processor unit on account of the control of an attacker or the key derivation cannot be controlled by the attacker. In particular, if an attacker has access to key material or to a key derivation function of a specimen of a device series, the security of the key material of another specimen of this device series is nevertheless not jeopardized even if, for example, the secret key is included as part of an FPGA bit stream as the configuration file of an FPGA and this bit stream is identically loaded onto a plurality of copies of a device series.

According to one refinement, the second parameter is used for the key derivation function in a manner that cannot be influenced by the request unit. In this case, "in a manner which cannot be influenced" provides that no dependence of the second parameter on a variable or a value or a property of the request unit exists or is possible. The request unit therefore has no opportunity whatsoever to influence the second parameter. In this case, "in a manner which cannot be influenced" provides, in particular, that the second parameter cannot be predefined or changed by the request unit or the second parameter cannot be replaced with a replacement parameter from the request unit. The second parameter is, in particular, completely predefined by the provision unit without influence from the request unit.

According to one refinement, the request unit is in the form of a main processor unit of the digital circuit area, and the digital circuit area is in the form of a system on chip.

Therefore, for a system on chip having a programmable digital circuit area and a programmable software execution environment, namely the main processor unit, the provision unit is implemented as a type of security function block. The security function block is likewise implemented in the digital circuit area and provides the request unit of the main processor of the system on chip, in particular, with a derived key. The provision unit or the security function block therefore carries out the key derivation internally in the common digital circuit area using a cryptographic secret key contained in the function block itself.

In particular, conventional implementations of FPGAs do not contain a non-volatile memory, with the result that a separate memory module would be needed to store data in a non-volatile memory. The secret key would therefore have to be stored in an external key memory, which reduces the security of the key derivation method and therefore of the provision of the cryptographic key material. An implementation variant, is also conceivable, however, in which the key used for the key derivation is read in from an external memory module in encrypted form, for example, and is decrypted using an internal key of the security function block. The key decrypted in this manner may then be used, as described above, as a secret key for the key derivation.

According to one refinement, the request unit is in the form of a main processor unit, and the main processor unit is in the form of a soft main processor unit in a programmable logic gate array.

The main processor unit of a system is exposed, in particular, to attacks that are aimed at manipulating the software executed on the main processor unit. Therefore, in a system on chip, it is not possible to assuredly assume that the unit, which is provided with a key, is trusted. According to the method described, if it is assumed that a request unit is not trusted, a derived key is also securely provided since the second parameter is also influenced only to a limited extent or is not influenced at all by an untrusted or manipulated request unit. The key derivation therefore cannot be completely controlled by the main processor unit.

A system on chip, which is implemented on an FPGA, is therefore protected against unauthorized access to cryptographic key material. This applies, in particular, to an implementation of the main processor unit as a soft main processor unit or soft CPU, which is implemented on the FPGA.

According to one refinement, the second parameter is derived from an identifier, memory contents, or a data record determined via an interface or a random number.

Therefore, the second parameter may, with its property of not being able to be predefined by the request unit or of being used completely without influence by the request unit, also be generated by the provision unit on the basis of specific data. If an identifier is included in the determination of the second parameter, the derived key is individualized, in particular, for the specimen or the device on which the digital circuit area is set up. The identifier may be a chip identification tag, a serial number, or an identifier, which is produced by the challenge-response inquiry of a physically unclonable function. Furthermore, memory contents of a configuration memory or program memory or the memory contents of a connected peripheral device such as, in particular, a sensor, an actuator or a memory card, may be included in the generation of the second parameter. In addition, the dependence on a random number is advantageous, in particular for key diversification. The second parameter may depend on one or more of the variants described or may be derived directly from one or more of the variants described.

According to one refinement, the request unit is also provided with the second parameter. The key derivation of the provision unit may therefore be verified, in particular.

According to one refinement, the key derivation function is in the form of a hash function, (e.g., SHA-256, SHA-3), a keyed hash function, (e.g., HMAC-SHA256), a cryptographic checksum calculation, (e.g., AES-CBCMAC), or a special key derivation function, (e.g., HKDF or PBKDF). The property of the key derivation function of being a one-way function therefore advantageously prevents conclusions from being able to be drawn with respect to the secret key or incoming parameters from the derived key.

According to one development, the key derivation function is applied to the secret key and a concatenation of the first parameter with the second parameter, or the key derivation function is applied in a concatenated manner with a first application to the secret key and the second parameter and with a second application to the result of the first application and the first parameter.

Different acts may therefore be carried out in order to carry out the key derivation using a plurality of key derivation parameters. In particular, the predefinition and order of parameters may advantageously be controlled.

According to one development, the derived key is also derived from a third parameter that may be updated and is determined by the provision unit on the basis of a derivation parameter provided by the request unit. The request unit may therefore additionally demand dependence on a time stamp or a seniority. In this case, the request unit, in particular, may transmit an item of raw information relating to a time or seniority to the provision unit. The provision unit determines the third parameter from this temporal information, the influence of which on the derived key is demanded by the request unit. The third parameter is therefore managed by the provision unit or the security function block, that is to say the third parameter, which is additionally transferred to the key derivation function as an input parameter, may be updated only under the control of the provision unit. Updating may be direct setting of the third parameter or setting of the third parameter for the first time, (e.g., if a third parameter has not yet been set). In particular, the update parameter may be directly used as the third parameter.

In another variant, updating is carried out by modifying the third parameter on the basis of the update parameter provided by the request unit. In this case, known key derivation functions may again be used. An available initialization parameter is only modified by the update parameter in this case, for example, by concatenation. The third parameter may be compulsorily or optionally used in the key derivation under the control of the request unit.

According to one refinement, the update parameter is used in a restricted manner, in particular, in a manner restricted by a period of time or a frequency of use of the update parameter. The restriction may involve, in particular, allowing setting or writing only once. It is also possible to allow repeated setting until a write lock is set. Furthermore, in one advantageous variant, it is only possible to generate an update parameter on the basis of an initial update value. A new, up-to-date update parameter is therefore always created on the basis of a previously valid update value. Similar calculation methods may also be advantageously used for this purpose, for example, keyed hash message authentication code methods. This prevents, in particular, the feigning of an earlier seniority at which a key derivation is intended to be carried out.

The embodiments also relate to a digital circuit area including a request unit for requesting a derived key from a provision unit and for transmitting a first parameter that may be predefined by the request unit to the provision unit, and including the provision unit for determining a secret key, access to the secret key by the request unit being able to be prevented, for generating the derived key by a key derivation function in a key derivation module from the secret key, the first parameter and a predefined second parameter, the second parameter being able to be used for the key derivation function in a non-predefinable manner by the request unit, and for providing the request unit with the derived key.

DETAILED DESCRIPTION

Figure 1:
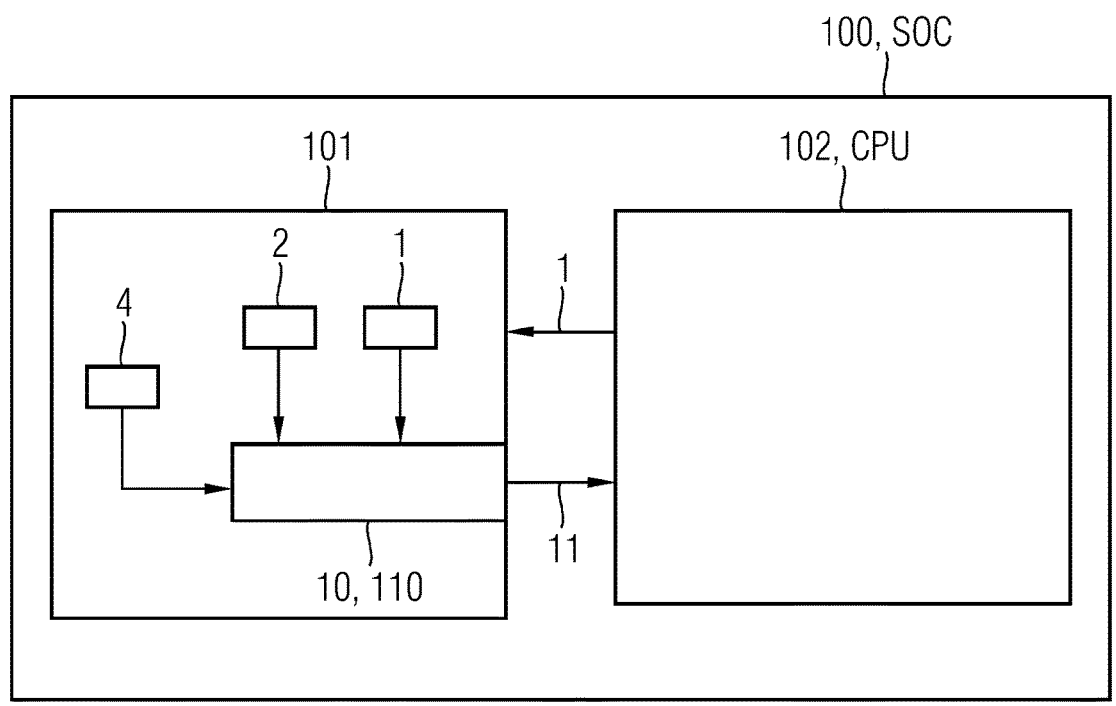
FIG. 1 depicts a schematic illustration of a digital circuit area for carrying out the method according to a first exemplary embodiment.

A first exemplary embodiment presents an advantageous implementation of the method for securely providing a key in a digital circuit area 100. The digital circuit area 100 is a system on chip SOC or a system on chip module. In particular, a main processor unit CPU acts as a request unit 102 for a cryptographic derived key 11. For this purpose, the main processor unit CPU transmits a request to a provision unit 101 inside the common digital circuit area 100. The provision unit 101 is therefore also integrated in the system on chip SOC. In this case, the main processor unit CPU transfers a predefinable first parameter 1. This first parameter 1 is selected by the main processor unit CPU and may contain, in particular, a statement relating to an intended purpose of the requested key. It may likewise also be sequential numbering of the key requests by the main processor unit CPU.

The provision unit 101 receives the request and the first parameter 1. The provision unit 101 is therefore a function block inside the system on chip SOC in which the key derivation is carried out on request. The provision unit 101 contains the secret key 4, in particular. A key derivation module 110 is provided inside the provision unit 101. A key derivation function 10 is implemented in this key derivation module 110. The key derivation module 110 is in the form of a programmable area inside the system on chip as a section inside the FPGA on which the entire provision unit is implemented.

The key derivation function 10 is a hash function such as SHA1, SHA2 or SHA3. In addition to the secret key 4, the first parameter 1 and a second parameter 2 are predefined for the key derivation function 10. This second parameter 2 is neither known to the request unit 102 nor may the request unit 102 obtain knowledge of the second parameter 2. The second parameter therefore cannot be influenced by the request unit 102 and is used independently of the request unit 102 such as the main processor unit CPU here. In addition, the second parameter 2 is independent of the first parameter 1 and the request from the main processor unit CPU.

The provision unit 101 generates the derived key 11 on the basis of the secret key 4, the first parameter 1 and the second parameter 2 and provides the request unit 102 with said derived key. The derived key 11 is output to the request unit and used, for example, for encrypting data such as measurement data or diagnostic data, which are provided via a data interface of the system on chip.

Furthermore, the derived key 11 may be used to check the integrity of configuration data stored in the system on chip SOC by calculating a cryptographic checksum. For this purpose, the key derivation is designed to be reproducible by the provision unit 101. For example, if an identical first parameter 1 is predefined, the second parameter 2 is used identically and the input parameter from the secret key 4 is used identically. If the derived key 11 is included in the checksum calculation for stored configuration data, an identical checksum may be generated at a later time using the derived key 11, which has been derived again and is therefore reproduced, only if the configuration data are intact and have not been manipulated.

The main processor unit CPU, which accesses the function block, may be implemented as a soft CPU, that is to say as part of the bit stream, (e.g., using NIOS2, Picoblaze, Microblaze, Lattice Mico8 etc., or as a hard CPU on an FPGA), that is to say as a function permanently provided in hardware, for example Xilinx Zynq or Altera Cyclone V SoC.

In one variant, an externally stored data record, for example, configuration data that are stored in a configuration EEPROM, may also be securely decrypted or securely read in. For this purpose, a configuration encryption key or a configuration key that includes, as parameters, the secret key and a second parameter compulsorily predefined by the provision unit, is produced in the provision unit. For this variant, the first parameter is predefined by the request unit, which is then the interface to the external unit. For example, the request for requesting the key is then forwarded to the provision unit via an external interface.

The first parameter may therefore be selected or predefined by that unit, which requests a key, either from inside or outside the digital circuit. The request unit may therefore also be a function of an interface that requests the derived key for an external unit.

The second parameter, which cannot be selected by this requesting unit, is used to assign the derived key to the actual hardware platform. The derived key is therefore tied to the hardware platform. The requesting unit may therefore only obtain a key for that hardware on which the key derivation function is actually implemented. It is not possible to request a key for another hardware specimen. Even if a hacker has therefore successfully compromised a device, for example by malware or root access, he may only determine the keys of the device that has been hacked. He cannot read the system key as the secret key and, in particular, he also cannot determine any keys for other devices as a result.

In another variant, the provision unit has a plurality of interfaces that may each be used by a request unit. In this case, it is possible for the second parameter to be selected on the basis of the interface. This has the advantage that an individual provision unit may be used by a plurality of request units, a first request unit and a second request unit being provided only with differently derived keys. In this case, "differently derived" provides that a first interface derivation parameter is used as the second parameter in the event of a request from the first request units via the first interface, and a second interface derivation parameter is used as the second parameter in the event of a request from the second request units via the second interface.

Figure 2:
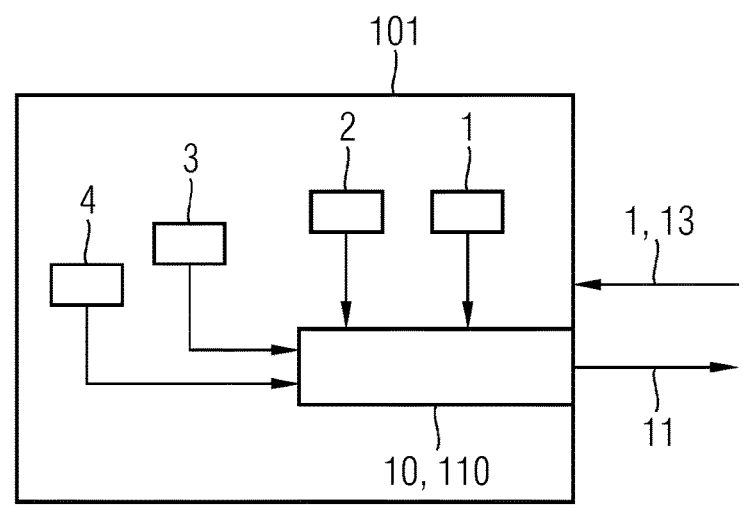
FIG. 2 depicts a schematic illustration of a provision unit for carrying out the method according to a second exemplary embodiment.

FIG. 2 is used to describe a second exemplary embodiment in which a provision unit 101 for generating the derived key 11 additionally takes into account a third parameter 3 that may be updated. For this purpose, a request unit inside a digital circuit area predefines a first parameter 1 for the provision unit 101 and provides the latter with an update parameter 13. A key derivation function 10 is used to generate the derived key 11 in a key derivation module 110 of the provision unit 101. The first parameter 1, the second parameter 2, the third parameter 3, and a secret key 4 are included as input parameters for the key derivation function 10. As described above, the second parameter 2 is a derivation parameter that is predefined by the provision unit 101 and cannot be influenced by the request unit. This second parameter 2 is directly included in the key derivation. The third parameter 3 is generated from the provided update parameter 13 by the provision unit 101. For example, a raw parameter available as standard is updated and modified by linking it to the update parameter 13 and applying a keyed hash function (HMAC). The value of the third parameter 3 therefore depends on the update parameter 13 provided by the request unit and on the checksum formation carried out by the provision unit 101.

The third parameter 3 is therefore produced under the control of the provision unit 101. For example, the third parameter 3 may be produced only once by virtue of an update parameter 13 being able to be provided only once. For example, a key may therefore advantageously be produced during a booting process, which key is needed to carry out the booting process. However, this key may no longer be produced at a later time because the update parameter 13 may be output only once. It is therefore possible to establish a time phase within which a specific key may be derived. The key is then permanently tied to the update parameter 13. In particular, this specific key may only be produced again during a new booting process.

Moreover, it is possible to predefine that an update value, which may be selected by a main processor unit, may be output within a predefined period of time as the update parameter 13. In this case, it is possible to state, in particular, a period of time within which the execution of the key derivation is harmless and after which the booting process may be assumed to be concluded.

Inside the operating system kernel, the derived key 11 may also be used to load and decrypt or check cryptographically protected configuration data from a configuration memory or a file system.

Furthermore, the derived key 11 may be requested for application programs, for example for opening a key store, which is to say in order to decrypt encrypted key data using the key provided.

The derived key 11 may also be used to decrypt a boot image, which is present in encrypted form. The derived key 11 is therefore provided for the function of the boot loader.

In order to implement the FPGA configuration for carrying out the method according to the second exemplary embodiment, for example, the configuration is transmitted, as a bit stream, when a system having the provision unit 101 is started, from an external memory to an internal configuration memory of the system. The bit stream configuration may be cryptographically protected; in particular, the bit stream is present in encrypted form or has been extended with a cryptographic checksum. The FPGA module decrypts the loaded encrypted bit stream and configures the internal hardware configuration blocks according to the loaded bit stream. The configuration may furthermore also be loaded onto the FPGA module in the form of an unprotected bit stream or in the form of configuration data. In one variant, it may also likewise be a fixed function of an ASIC.

If the configuration is in the form of a bit stream, the described provision unit 101 may be implemented as a security function block as part of the bit stream. It may be created, for example, in VHDL, Verilog, or System C. The individual functions may be implemented directly as digital logic in the register transfer level (RTL).

The decryption of a bit stream is a fixed, predefined function of an FPGA, in particular. The key used for this purpose is configurable. In one variant, the derived key 11 is determined, as described above, by the provision unit 101 on the basis of a preconfigured key. Furthermore, a fixed key, that is to say a key, which may be determined by the FPGA manufacturer, may also be included in the key derivation in addition or instead. The bit stream is then decrypted using the derived key 11. Since a bit stream is encrypted specifically for each specimen of an FPGA module in order to be able to be correctly decrypted on the latter, a device manufacturer is provided with a specimen-specific key of an FPGA module by the FPGA manufacturer, for example. This may be effected, for example, on paper, via a web portal or using an unlocked readable FPGA module. The latter provides that the FPGA module, as delivered, provides the key, but this is no longer possible after a fuse has blown. This achieves effective copying protection.

The presented method and the digital circuit area are used to derive a key from parameters, at least one parameter of which is used for the key derivation in a non-predefinable manner by the request unit.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for securely providing a derived key using a request unit and a provision unit, the method comprising:
   requesting, by the request unit, the derived key from the provision unit, wherein the request unit and the provision unit are integrated in a system on a chip;
   transmitting a first parameter from the request unit to the provision unit, wherein the first parameter is predefined by the request unit;
   determining a secret key by the provision unit, wherein the request unit does not have access to the secret key;
   deriving a second parameter, by the provision unit, from a chip identification tag, a serial number, an identifier produced by a challenge-response inquiry of a physically unclonable function, memory contents, a random number, or a combination thereof;
   generating the derived key, by the provision unit, from the secret key, the first parameter, and the second parameter, wherein the derived key is generated by a key derivation function in a key derivation module within the provision unit, and wherein the second parameter is used for the key derivation function in a non-predefinable manner by the request unit; and
   providing the request unit with the derived key.

2. The method as claimed in claim 1, wherein the second parameter is used for the key derivation function in a manner that cannot be influenced by the request unit.

3. The method as claimed in claim 1, wherein the request unit comprises a main processor unit of the system on chip.

4. The method as claimed in claim 3, wherein the main processor unit is a soft main processor unit in a programmable logic gate array.

5. The method as claimed in claim 1, wherein the second parameter is derived from the chip identification tag, the serial number, or the identifier produced by the challenge-response inquiry of the physical unclonable function.

6. The method as claimed in claim 1, wherein the key derivation function comprises a hash function, a keyed hash function, or a cryptographic checksum calculation.

7. The method as claimed in claim 1, wherein the key derivation function is applied to the secret key and a concatenation of the first parameter with the second parameter, or the key derivation function is applied in a concatenated manner with a first application to the secret key and the second parameter and with a second application to a result of the first application and the first parameter.

8. The method as claimed in claim 1, wherein the derived key is derived from a third parameter that is updated and determined by the provision unit on a basis of an update parameter provided by the request unit.

9. The method as claimed in claim 8, wherein the update parameter is used in a restricted manner, wherein the manner is restricted by a period of time or a frequency of use of the update parameter.

10. The method as claimed in claim 1, wherein the second parameter is derived from the memory contents, wherein the memory contents comprise contents of a configuration memory or a program memory.

11. The method as claimed in claim 1, wherein the second parameter is derived from the random number.

12. A system on a chip comprising:
a request unit; and
a provision unit having a key derivation module,
wherein the request unit is configured to:
   request a derived key from a provision unit; and
   transmit a first parameter to the provision unit, the first parameter predefined by the request unit;
wherein the provision unit is configured to:
   determine a secret key, wherein access to the secret key by the request unit is able to be prevented;
   derive a second parameter from a chip identification tag, a serial number, an identifier produced by a challenge-response inquiry of a physically unclonable function, memory contents, a random number, or a combination thereof;
   generate the derived key from the secret key, the first parameter, and the second parameter, wherein the derived key is generated by a key derivation function in the key derivation module, wherein the second parameter is able to be used for the key derivation function in a non-predefinable manner by the request unit; and
   provide the request unit with the derived key.

13. The system on a chip as claimed in claim 12, wherein the second parameter is configured to be used by the request unit for the key derivation function in a manner that is not influenced by the request unit.

14. The system on a chip as claimed in claim 12, wherein the request unit is a main processor unit.

15. The system on a chip as claimed in claim 14, wherein the main processor unit is a soft main processor unit in a programmable logic gate array.

16. The system on a chip as claimed in claim 12, wherein the second parameter is derived from the chip identification tag, the serial number, or the identifier produced by the challenge-response inquiry of the physical unclonable function.

17. The system on a chip as claimed in claim 12, wherein the key derivation function is a hash function, a key hash function, or a cryptographic checksum calculation.

18. The system on a chip as claimed in claim 12, wherein the key derivation function is applied to the secret key and a concatenation of the first parameter with the second parameter, or the key derivation function is applied in a concatenated manner with a first application to the secret key and the second parameter and with a second application to the result of the first application and the first parameter.

19. The system on a chip as claimed in claim 12, wherein the derived key also is derived from a third parameter, wherein the third parameter is determined by the provision unit based on an update parameter provided by the request unit, and wherein the third parameter is configured to be updated.

20. The system on a chip as claimed in claim 19, wherein the update parameter is used in a restricted manner, wherein the manner restricted by a period of time or a frequency of use of the update parameter.

* * * * *